United States Patent Office.

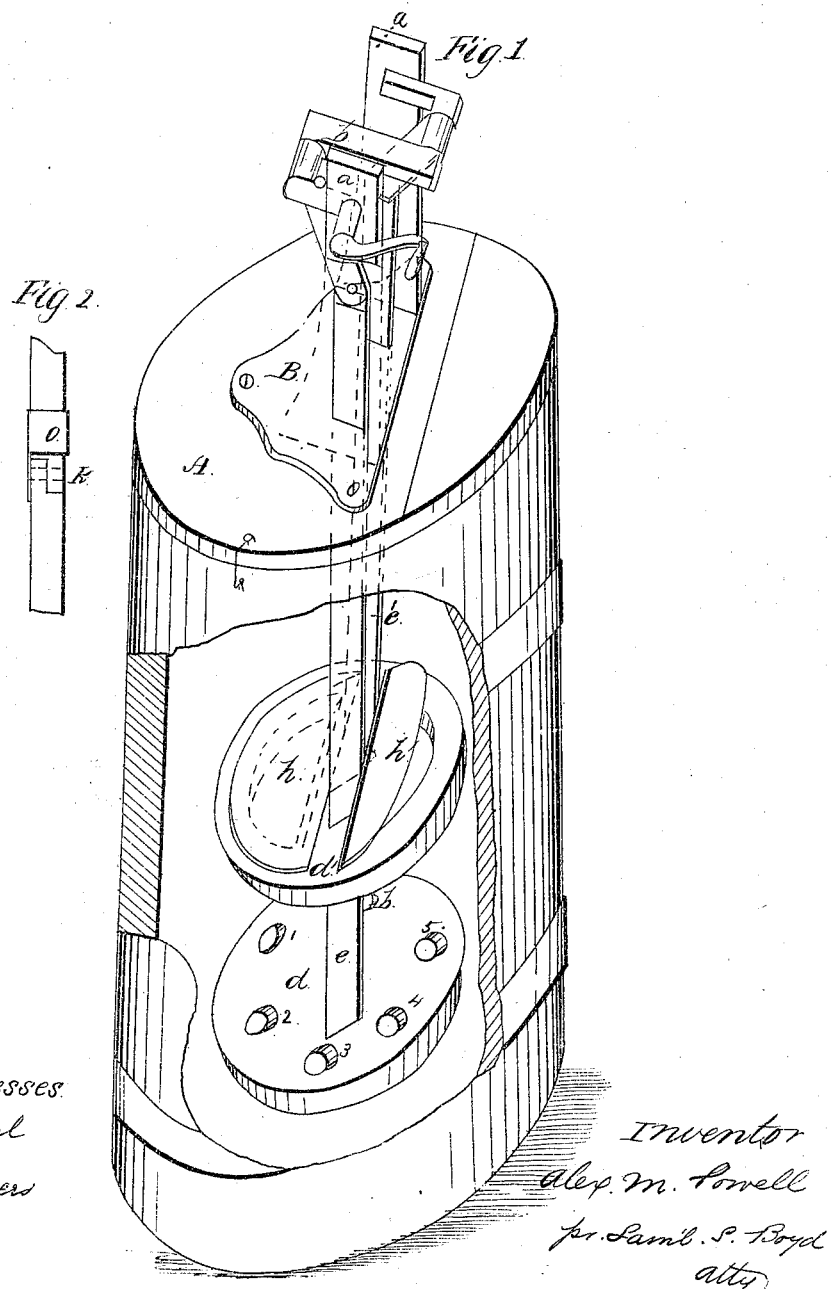

A. M. POWELL, OF COLLINSVILLE, ILLINOIS, ASSIGNOR TO HIMSELF, WILLIAM J. MATTHEWS, AND HEZEKIAH R. JOHNSON, OF SAME PLACE.

Letters Patent No. 91,562, dated June 22, 1869.

IMPROVEMENT IN CHURNS.

The Schedule referred to in these Letters Patent and making part of the same.

*To all whom it may concern:*

Be it known that I, A. M. POWELL, of Collinsville, Madison county, State of Illinois, have invented a new and useful Improved Churn, of which the following is a full, clear, and exact description, reference being had to the annexed drawings, making a part of this specification, in which—

Figure 1 represents a perspective side elevation of my churn, with a portion broken out, showing the interior.

Figure 2 represents a detail of same, hereinafter described.

Similar letters indicate like parts.

On the top of an ordinary churn, A, I place a frame, B, the uprights $a$ $a'$ of which serve as the bearings for a double crank-shaft, $b$.

Two dashers, $d$ $d'$, are connected with these cranks by rods $e$ $e'$, the rod $e$ being somewhat longer than $e'$, and passing through a slot in $d'$, as seen.

The dasher $d$ is pierced with numerous holes, 1, 2, 3, &c., while $d'$ has two semicircular openings, closed by valves $h$ $h'$, the latter being shown open.

The dashers nearly equal in diameter the interior of the churn, space enough being left to allow them to work freely, it not being intended they should have any power of suction such as to require them to fit closely.

The rods $e$ $e'$ are in two parts, dovetailed together, as seen in figs. 1, 2, the parts being kept together by a pin, $k$, and sliding clasp $o$, as clearly seen in fig. 2.

This is for the purpose of disconnecting the dashers from the gearing, whenever desired, for cleaning or transportation.

When the dashers are set in motion, as the lower one rises, the upper one descends, opening its valves, which allows the thickened cream to pass through and rise to the top, when, on the return motion, the valve is closed.

Of course, when the dasher again descends, it leaves the butter already formed on top, instead of carrying it down again and breaking it up, which would be the case were the dasher not provided with the valve.

This, and the superior agitation given the cream, are the advantages of my churn.

I, of course, do not claim any originality in having two dashers, or in the motion given them by the double crank-shaft; but I only claim as my invention, and desire to secure by Letters Patent—

The combination of the dashers $d$ $d'$, valves $h$ $h'$, and connecting-rods $e$ $e'$, arranged as shown and specified, and constructed substantially as hereinbefore described.

A. M. POWELL.

Witnesses:
THOS. MUNN,
J. A. GRIFFITH.